Sept. 3, 1963     Z. ZACPAL ET AL     3,102,719
METHOD OF PREHEATING PULVERULENT MATERIALS
Filed May 31, 1961
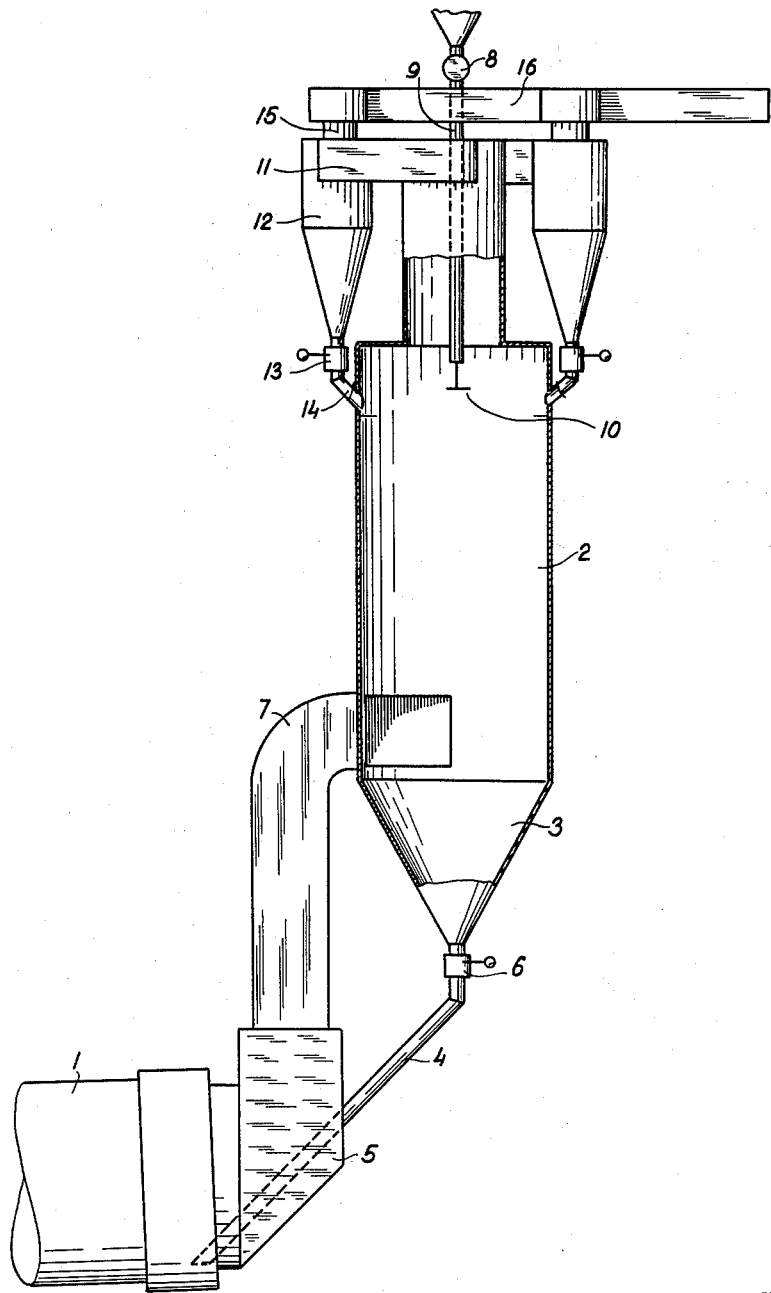
INVENTORS
Zdeněk Zacpal, Jiří Šafář
BY

3,102,719
METHOD OF PREHEATING PULVERULENT MATERIALS

Zdeněk Zacpal, Horni Mostenice, near Prerov, and Jiří Šafář, Prerov, Czechoslovakia, assignors to Prerovske strojirny, narodni podnik, Prerov, Czechoslovakia
Filed May 31, 1961, Ser. No. 113,925
Claims priority, application Czechoslovakia July 26, 1960
3 Claims. (Cl. 263—29)

This invention relates to a method of preheating, cooling, and drying pulverulent materials, in particular cement raw materials constituting the dry process and equipment for performing thereof. The equipment, described hereinafter, may be employed also for cooling purposes.

The preheating of pulverulent materials before the burning process in rotary kilns or other heating equipments takes place in preheating units, installed in front of the feed end of the rotary kilns. The preheating units of the latter type comprise cyclone-heat-exchangers, interconnected by means of pneumatic heating conduits. The heat-exchange between the gases and the material passing in reverse order to that of the heated gases is effected in individual sections, their run being co-current, whereby the preheating efficiency considerably decreases. Thus, for example, if combustion gases of 900–1000 degrees centigrade are made use of, the material will be preheated to 700–730 degrees centigrade. Furthermore, the manufacturing cost of the whole preheating system comprising a series of cyclones, interconnected by means of conduits, is rather high and the assembly of the whole structure improper, as the building height amounts up to 50 m.

In other preheating units, comprising preheating shafts, which are understood to be heated by combustion gases discharged from the rotary kilns or other heating equipments and entering the shaft tangentially, there are vortex cores arranged in the inner space of the shaft, which maintain the rotary movement of the heated gases in the given speed the entire height of the preheating shaft along. The shaft is divided by means of the vortex cores into a series of sections, the material being separated herefrom into the separating bins, arranged tangentially on the outer surface of the vertical heating shaft, wherefrom it is continuously directed into the lower sections. In spite of the run of the material being countercurrent to that of the heated gases, the preheating efficiency brought about by this method doesn't guarantee the most economic utilization of heat contained in the heated gases, as the considerable amount of material particles separated in the bins is not in direct contact with these gases.

Furthermore, the installation of vortex cores, separating bins and conduits of a considerable length for passing the material in the sections next lower, has the disadvantage of making the shaft complicated, the operation thereof being more difficult and the manufacturing cost consequently much higher. The invention relates to preheating units of this type. It is the object of this invention to provide a preheating shaft which will have advantages over the old types in reduced manufacturing cost of the preheating shaft, simplified operation thereof and an improved heat efficiency.

This will be accomplished in that the heat transfer from the heated gases into the material, travelling into the preheating shaft of annular cross section downwards is effected in counter-current lengthwise through the said shaft.

The most outstanding feature offered by this invention is the considerably increased utilization of heated combustion gases rendering hereby the maximal preheating efficiency.

According to this invention a preheating unit of considerable simpler construction is provided, the manufacturing and maintenance cost being much lower, the vortex cores, separating bins and conduits connecting the individual sections of the shaft being not necessary. The preheating unit as defined hereinbefore, can be installed separately, no special building being hereby necessary. The dimensions of the shaft could be reduced, as desired.

This invention will be understood more clearly in the accompanying drawing illustrating the preheating shaft in a schematic fragmentary cross section and view.

The preheating of pulverulent material is effected in the preheating shaft 2, its lower part being formed into an outlet-chamber 3, which is in communication with the rotary kiln 1 by means of the closing member 6, dust-chamber 5 and conduit 4. The heated gases enter the shaft 2 tangentially, through the conduit 7 in order to maintain the rotary velocity component along the entire cross section of the shaft 2.

The material for preheating is admitted through the feeding member 8 and conduit 9 on the baffle-plate 10 in the upper part of the preheating shaft 2. Due to the rotary velocity component of the heated gases, discharged from the rotary kiln 1, a vortex in the inner space of the shaft 2 is effected, wherein the material is introduced continuously via duct 9. After the material has been introduced into the vortex of the heated gases, the material particles are partially carried away from the shaft 2 via conduit 11 into the separators 12, due to the small amount of the material contained in the vortex of heated combustion gases. The separated material particles will together with the material continuously conveyed from the conduit 9 a certain operation time increase the density of the heated combustion gases in the vortex in such a way as to cause the material particles to move downwardly, the run of them being countercurrent to that of the heated gases. In this way the heat transfer from the gases into the material provided for, is practically countercurrent the whole preheating time long, the maximal utilization of heat contained in the gases being thus guaranteed. The material preheated to the desired temperature collects in the lower part of the shaft 2, formed to an outlet-chamber 3, wherefrom it is directed for additional heat treatment into the rotation kiln 1. The cooled gases from the preheating shaft 2 leave the said shaft tangentially in the most upper section thereof via conduit 11 and enter the separators 12 and are conveyed through conduits 15 and 16 for additional utilization.

What we claim is:

1. A method of preheating a pulverulent material which comprises
   (a) feeding said material to the top of a shaft having a vertically extending axis for downward movement in said shaft;
   (b) feeding a hot gas to the bottom of said shaft in a tangential path for spiraling upward movement countercurrent to said material, whereby said material is heated;
   (c) withdrawing said gas from the top of said shaft in a tangential direction;
   (d) separating entrained particles of said material from the withdrawn gas;
   (e) returning the separated particles to the top of said shaft; and
   (f) withdrawing the heated material from the bottom of said shaft.

2. In a heating apparatus, in combination:
   (a) a shaft having a vertically extending axis;
   (b) a first conduit communicating with the top of said shaft for feeding a pulverulent material to said top;

(c) a second conduit communicating with the bottom of said shaft in a tangential direction relative to said axis;
(d) a source of hot gas connected to said second conduit;
(e) a third conduit communicating with said top for withdrawing gas therefrom in a direction tangential relative to said axis;
(f) separator means in said third conduit;
(g) a fourth conduit downwardly extending from said separator means to the top of said shaft and connecting said separator means to said top for return of separated material to said shaft; and
(h) a fifth conduit communicating with the bottom of said shaft for withdrawing pulverulent material from said bottom.

3. In the method according to claim 1, causing the heating of said material by said spiraling upward movement of said hot gas to take place substantially through the entire height and across the entire cross section of said shaft.

References Cited in the file of this patent
UNITED STATES PATENTS

| | | |
|---|---|---|
| 748,893 | Trump | Jan. 5, 1904 |
| 2,613,138 | Van Loon | Oct. 7, 1952 |
| 2,728,995 | Schaub | Jan. 3, 1956 |

FOREIGN PATENTS

| | | |
|---|---|---|
| 795,728 | Great Britain | May 28, 1958 |